United States Patent [19]

Okubo et al.

[11] Patent Number: 4,905,028

[45] Date of Patent: Feb. 27, 1990

[54] ELECTROPHOTOGRAPHIC PRINTER

[75] Inventors: Takehiko Okubo; Shigeki Nakajima, both of Tokyo, Japan

[73] Assignee: Oki Electric Industry Co., Ltd., Tokyo, Japan

[21] Appl. No.: 370,438

[22] Filed: Jun. 23, 1989

[30] Foreign Application Priority Data

Jun. 30, 1988 [JP] Japan .............................. 63-87337[U]

[51] Int. Cl.⁴ ............................................. G01D 15/00
[52] U.S. Cl. ...................................... 346/160; 346/145
[58] Field of Search ................... 346/160, 145, 107 R, 346/108, 766, 134; 358/300, 302; 400/119

[56] References Cited

U.S. PATENT DOCUMENTS 4,785,319 11/1988 Fujino .................................. 346/160
4,796,037 1/1989 Takada et al. ....................... 346/160
4,809,032 2/1989 Nakatomi et al. ................... 346/160

Primary Examiner—Arthur G. Evans
Attorney, Agent, or Firm—Panitch, Schwarze, Jacobs & Nadel

[57] ABSTRACT

An electrophotographic printer comprises an access cover for opening and closing an upper opening of a cavity in an enclosure, a rotatable head holder supported at one adjacent to the inner surface of the access cover, an optical print head provided on the inner surface of the head holder, and a process cartridge containing a photosensitive drum provided so that it can be inserted and removed through the upper opening. The optical print head may have holes provided at both ends thereof, and the process cartridge may have pins which are engageable with the holes on the optical print head, thereby to facilitate alignment between the optical print head and the photosensitive drum. The optical print head may have a surface electrode, and the enclosure may have a pressure-contact type connector, so that when the head holder is closed, the surface electrode of the optical print head and the pressure-contact type connector of the enclosure are connected to enable supply of electric power and print signals to the optical print head.

6 Claims, 2 Drawing Sheets 42  41                                    41

ELECTROPHOTOGRAPHIC PRINTER

BACKGROUND OF THE INVENTION

The present invention relates to an electrophotographic printer having a photosensitive drum and an optical print head.

A conventional electrophotographic printer was not satisfactory in that insertion and removal of a photosensitive drum was difficult, the photosensitive drum could be damaged.

SUMMARY OF THE INVENTION

An object of the invention is to eliminate the above problems.

Another object of the invention is to facilitate insertion and removal of a photosensitive drum.

Another object of the invention is to prevent damage to the photosensitive drum during insertion and removal of the photosensitive drum.

Another object of the invention is facilitate alignment between the photosensitive drum and the optical print head.

An electrophotographic printer according to the invention comprises: an enclosure having a cavity with an upper opening; an access cover for opening and closing the upper opening; a rotatable head holder supported adjacent to the inner surface of the access cover so that it can rotate; an optical print head provided on the inner surface of the head holder and fixed via coil springs and latch brackets to the head holder; and a process cartridge containing a photosensitive drum provided so that it can be inserted in and removed from the cavity through the upper opening.

The optical print head may have holes provided at both ends thereof, and the process cartridge may have pins fitting in the holes on the optical print head, thereby to facilitate alignment between the photosensitive drum and the optical print head.

The optical print head may have surface electrodes, and the enclosure may have contacts of a pressure-contact type connector, so that when the head holder is closed, the surface electrode of the optical print head and the contacts of the pressure-contact type connector of the enclosure are connected to enable supply of power and print signals.

DETAILED DESCRIPTION OF THE EMBODIMENTS

Figure 1:
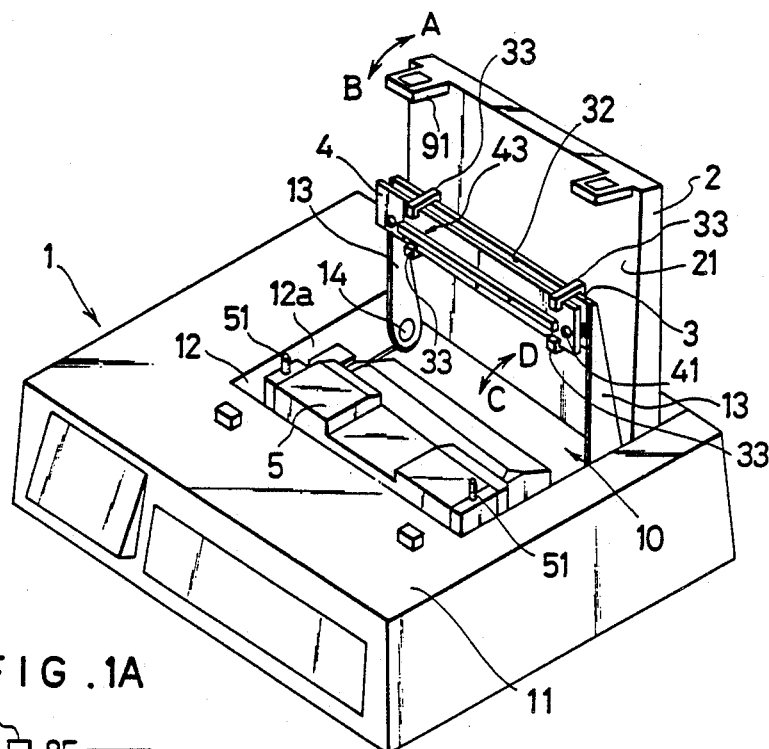
FIG. 1 is an oblique view showing an embodiment of electrophotographic printer according to the invention.

An embodiment of the invention will now be described with reference to FIG. 1.

An electrophotographic printer 1 comprises an enclosure 11 having a cavity 10 with an upper opening 12. An access cover 2 is provided to open and close the upper opening 12. A strip-shaped head holder 3 is supported by a pair of arms 13, which are mounted to the inner side surfaces 12a (only one of them being illustrated) of a cavity communicating with the upper opening 12 so that they are rotatable about an axis 14 of rotatable support. The head holder 3 is disposed adjacent to the inner surface 21 of the access cover 2. An optical print head 4 is mounted to the inner surface 32 of the head holder 3. More particularly, the optical print head 4 is fixed via coil springs 15 and the latch brackets 33 to the inner surface 32 of the head holder 3. The optical print head 4 can be one incorporating an LED (light-emitted diode) array 43, a liquid crystal type, or plasma display type.

An electrophotographic process cartridge 5 containing a photosensitive drum 6 can be inserted through the upper opening 12, sliding along a guide, not shown, and being received by a receptacle, also not shown.

The process cartridge 5 can also be removed through the upper opening, for inspection, repair, and exchange.

Figure 2:
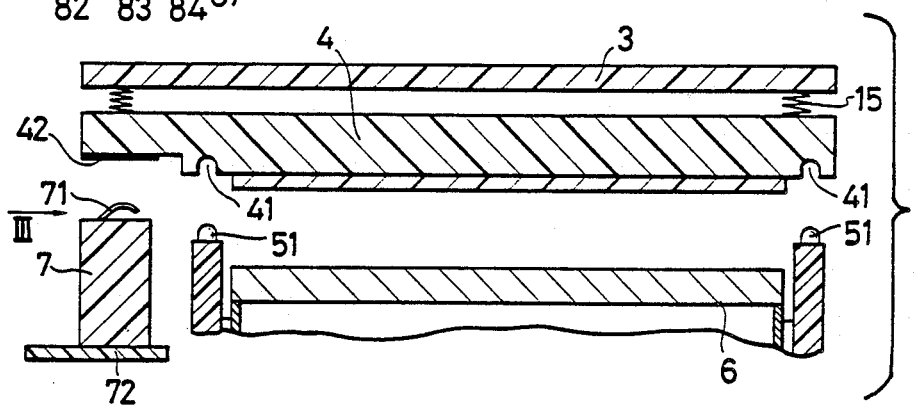
FIG. 2 is a sectional view showing how the optical print head and the process cartridge are positioned relative to each other.

The process cartridge 5 and the optical print head 4 are aligned relative to each other, as will be described later. The photosensitive drum 6 contained in the process cartridge 5 and the optical print head 4 are therefore aligned relative to each other. For this purpose, as shown in FIG. 2, holes 41 are provided at both ends of the optical print head 4 and pins 51 are provided on both sides of the process cartridge 5 to extend upward, and these holes 41 and pins 51 are engageable with each other. As the holes 41 and pins are engaged with each other, the process cartridge 5, and hence the photosensitive drum 6 and the optical print head 4 are aligned precisely relative to each other.

Figure 3:
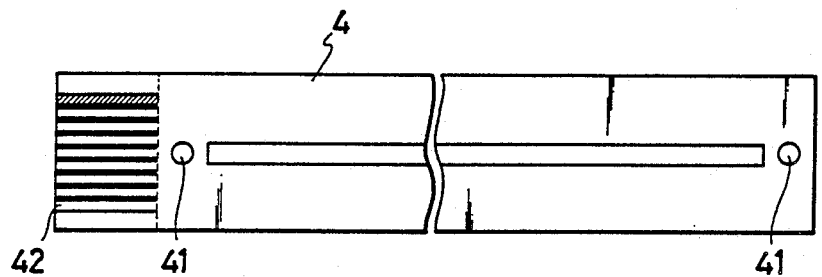
FIG. 3 is a diagram showing the optical print head as seen from the side at which the light is emitted.
Figure 4:
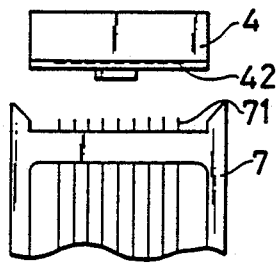
FIG. 4 is a diagram along line A in FIG. 2.

As is shown in FIG. 3, a surface electrode 42 is exposed on either the left or right side of the optical print head 4. A pressure-contact type connector 7 is provided in and fixed to the enclosure 11. Provided on the upper surface of the pressure-contact type connector 7 are pressure-contacts 71 formed of an electrically-conductive spring material and having a pattern corresponding to the electrode pattern on the surface electrode 42. A control circuit board 72 is mounted to the pressure-contact type connector 7 so that they are electrically connected with the contacts 71.

When the head holder 3 is closed, the pressure-contact type connector 7 and the optical print head 4 are connected. Electric power and print signals are then supplied through the contacts 71 and the surface electrodes 42 from the control circuit board 72.

Insertion, positioning and removal of the photosensitive drum 6 are as follows:

As described above, the photosensitive drum 6 is contained in the process cartridge 5. When the process cartridge 5 is inserted through the upper opening 12 into the cavity 10, the photosensitive drum 6 is fixed at a predefined position.

When the access cover 2 is closed as indicated by arrow B, the head holder 3, being pushed by the inner surface 21 of the access cover 2, rotates about the axis 14 of rotation, as indicated by arrow C. That is, these two members move together. By virtue of the rotation, the optical print head 4 is positioned relative to the process cartridge 5 so that the holes 41 confront the pins 51 as shown in FIG. 2. When the access cover 2 is further pushed down, the pins 51 are engaged with the holes 41. During the rotation, the coil springs 15 inserted between the head holder 3 and the optical print head 4 bias the optical print head 4 downward so that the holes 41 are brought into engagement with the pins 51 thereby accurately positioning the optical print head 4 even if there is a certain inaccuracy on the optical print head 4.

It is therefore ensured that the optical print head 4 has a fixed positional relationship, i.e., is in alignment with the photosensitive drum 6.

When the holder 3 is closed, the surface electrode 42 and the contacts 71 of the pressure-contact type connector 7 are pressure-contacted.

Since the optical print head 4 is mounted to the head holder 3 via the coil springs 15, and the contacts 71 themselves have resiliency, electrical connection between the contacts 71 and the surface electrode 42 is obtained together with the above-mentioned alignment.

Figure 1A:
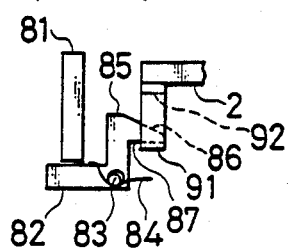
FIG. 1A is a schematic diagram showing a mechanism for releasably holding the access cover.

To remove the photosensitive drum 6 out of the cavity 10, cover opening buttons 81 are pushed, so that each of the levers (only one being shown in FIG. 1A) having arms 82 and 83 and associated with the buttons 81 rotates about a pin 84 fixed to the enclosure 11 and a tapered tip 87 of the arm 85 is retracted to be disengaged from an aperture 92 of each engagement member 91 fixed to the access cover 2. The access cover 2 is opened as shown by arrow A by virtue of the resiliency of the coil springs 15 and the resiliency of the contacts 71. The head holder 3 can be opened further to obtain a wider opening by manually moving the head holder 3 in the direction of arrow D. The process cartridge 5 can then be taken out through the upper opening 12. The photosensitive drum 6 contained in the process cartridge 5 is attendantly taken out. The process cartridge 5 serves as a protective case preventing damage to the photosensitive drum 6 during insertion and removal of the photosensitive drum 6. Furthermore, holes 41 may be provided on the process cartridge 5 and the pins 51 may be provided on the print head 4.

When the buttons 81 are released they return to the original position by virtue of the resiliency of the spring 84. The tapered tip 87 of each lever is also retracted and returned as the access cover 2 is closed, by the cam action of the lower surface 93 of the engagement member 91 and the upper inclined surface 86 of the tip 87, and by the resiliency of the spring 84.

As has been described, according to the invention, the positional relationship, or the alignment between the optical print head and the photosensitive drum is maintained as desired. Accordingly, the print accuracy is improved. Insertion and removal of the photosensitive drum for the purpose of inspection, repair, exchange, etc. can be made with ease, without damaging the photosensitive drum. Electric power and print signals can be supplied through the contacts which are established when the head holder is closed, so the cables and the space for the cables can be reduced. Moreover, when the head holder is opened supply of the electric power and print signals is interrupted, so erroneous operation can be prevented.

What is claimed is:

1. An electrophotographic printer comprising:
   an enclosure having a cavity with an upper opening;
   an access cover for opening and closing the upper opening;
   a rotatable head holder supported adjacent to the inner surface of said access cover so that it can rotate;
   an optical print head provided on the inner surface of said head holder; and
   a process cartridge containing a photosensitive drum provided so that it can be inserted and removed through said upper opening.

2. An electrophotographic printer according to claim 1, wherein said head holder is closed being pushed by the inner surface of the access cover as the access cover is closed.

3. An electrophotographic printer according to claim 1, wherein said optical print head is fixed via coil springs and latch brackets to the inner surface of said head holder.

4. An electrophotographic printer according to claim 1, wherein
   said optical print head has holes provided at both ends thereof;
   said process cartridge has pins which are engageable with said holes on said optical print head, thereby to facilitate alignment between said optical print head and said photosensitive drum.

5. An electrophotographic printer according to claim 4, wherein said pins extend upward, and said holes confront and then are brought in engagement with said pins as the head holder is closed.

6. An electrophotographic printer according to claim 1, wherein
   said optical print head has a surface electrode;
   said enclosure has a pressure-contact type connector; and
   when the head holder is closed, said surface electrode of said optical print head and said pressure-contact type connector of said enclosure are connected to enable supply of electric power and print signals to said optical print head.

* * * * *